(12) United States Patent
Hecker et al.

(10) Patent No.: US 11,572,044 B2
(45) Date of Patent: Feb. 7, 2023

(54) BRAKE REDUNDANCY CONCEPT FOR HIGHLY AUTOMATED DRIVING

(71) Applicant: KNORR-BREMSE SYSTEME FUER NUTZFAHRZEUGE GMBH, Munich (DE)

(72) Inventors: Falk Hecker, Markgröningen (DE); Adnan Mustapha, Maulbronn (DE); Oliver Jundt, Hessigheim (DE); Rüdiger Weis, Stuttgart (DE); Jürgen Steinberger, Gröbenzell (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 218 days.

(21) Appl. No.: 16/755,897

(22) PCT Filed: Oct. 16, 2018

(86) PCT No.: PCT/EP2018/078185
§ 371 (c)(1),
(2) Date: Apr. 14, 2020

(87) PCT Pub. No.: WO2019/076861
PCT Pub. Date: Apr. 25, 2019

(65) Prior Publication Data
US 2021/0206374 A1     Jul. 8, 2021

(30) Foreign Application Priority Data

Oct. 16, 2017    (DE) ............... 10 2017 218 488.4

(51) Int. Cl.
*B60T 8/17*          (2006.01)
*B60T 7/04*          (2006.01)
(Continued)

(52) U.S. Cl.
CPC ............... *B60T 8/17* (2013.01); *B60T 7/042* (2013.01); *B60T 7/12* (2013.01); *B60T 8/176* (2013.01);
(Continued)

(58) Field of Classification Search
CPC ... B60T 8/17; B60T 7/042; B60T 7/12; B60T 8/146; B60T 8/327; B60T 8/92;
(Continued)

(56) References Cited

U.S. PATENT DOCUMENTS

2010/0019565 A1* 1/2010 Broch ............... B60T 8/1708
                                                      303/7
2013/0184957 A1   7/2013 Herges et al.
(Continued)

FOREIGN PATENT DOCUMENTS

CN         1651292 A     8/2005
CN       101254785 A     9/2008
(Continued)

OTHER PUBLICATIONS

International Search Report dated Feb. 13, 2019 of the corresponding International Application PCT/EP2018/078185.

*Primary Examiner* — Dale W Hilgendorf
*Assistant Examiner* — Hana Lee
(74) *Attorney, Agent, or Firm* — Norton Rose Fulbright US LLP; Gerard Messina; Aaron Deditch

(57) ABSTRACT

An apparatus for generating non-electric control signals for a brake system, which has a first supply source, including: at least one interface configured to be connected to a pressure accumulator; and at least one interface to output the control signals; in which the apparatus is configured to be supplied via a second supply source. Also described are a related module and an electronic brake system.

17 Claims, 6 Drawing Sheets

(51) Int. Cl.
*B60T 7/12* (2006.01)
*B60T 8/176* (2006.01)
*B60T 8/32* (2006.01)
*B60T 8/92* (2006.01)
*B60T 13/02* (2006.01)
*B60T 13/26* (2006.01)
*B60T 13/66* (2006.01)
*B60T 13/74* (2006.01)
*B60T 17/22* (2006.01)
*B60W 60/00* (2020.01)
*B60W 30/18* (2012.01)
*B60W 50/10* (2012.01)

(52) U.S. Cl.
CPC ............... *B60T 8/327* (2013.01); *B60T 8/92* (2013.01); *B60T 13/02* (2013.01); *B60T 13/268* (2013.01); *B60T 13/662* (2013.01); *B60T 13/74* (2013.01); *B60T 17/221* (2013.01); *B60W 30/18109* (2013.01); *B60W 50/10* (2013.01); *B60W 60/001* (2020.02); *B60T 2240/00* (2013.01); *B60T 2270/10* (2013.01); *B60T 2270/402* (2013.01); *B60T 2270/404* (2013.01); *B60T 2270/413* (2013.01); *B60T 2270/82* (2013.01); *B60W 2510/182* (2013.01)

(58) Field of Classification Search
CPC ...... B60T 13/02; B60T 13/268; B60T 13/662; B60T 13/74; B60T 17/221; B60T 2240/00; B60T 2270/10; B60T 2270/402; B60T 2270/404; B60T 2270/413; B60T 2270/82; B60W 60/001; B60W 30/18109; B60W 50/10; B60W 2510/182
See application file for complete search history.

(56) References Cited

U.S. PATENT DOCUMENTS

| | | | |
|---|---|---|---|
| 2013/0261857 A1 | 10/2013 | Matsuyama | |
| 2016/0339885 A1* | 11/2016 | Linhoff | B60T 8/368 |
| 2017/0267221 A1 | 9/2017 | Hecker et al. | |
| 2019/0248346 A1* | 8/2019 | Wulf | B60T 13/683 |
| 2020/0156601 A1* | 5/2020 | Goers | B60T 8/26 |

FOREIGN PATENT DOCUMENTS

| | | | |
|---|---|---|---|
| CN | 202728206 U | 2/2013 | |
| CN | 105916746 A | 8/2016 | |
| DE | 102008009043 B3 | 5/2009 | |
| DE | 102016112335 A1 | 1/2018 | |
| EP | 2570316 A1 | 3/2013 | |
| EP | 2398684 B1 | 6/2013 | |
| JP | 2017518922 A | 7/2017 | |
| WO | 2017194512 A1 | 11/2017 | |

* cited by examiner

US 11,572,044 B2

BRAKE REDUNDANCY CONCEPT FOR HIGHLY AUTOMATED DRIVING

FIELD OF THE INVENTION

The present invention relates to an apparatus and a module for upgrading of an electronically controlled brake system for vehicles, in particular autonomously driven commercial vehicles. Furthermore, the invention relates to an electronically controlled brake system.

BACKGROUND INFORMATION

Vehicles, in particular commercial vehicles, with highly automated driving functions which relieve the driver of the driving task and the driving responsibility (at least for a limited time) have to continue the vehicle driving in the case of an occurrence of an arbitrary fault, until the driver re-assumes the responsibility. The "fail-operational" system property which is derived herefrom requires that the basic functions continue to be ensured, in particular, on the execution level, possibly with functional restrictions. For the brake control operation, this means that the vehicle can still be braked in an electronically controlled manner even in the case of an arbitrary fault, and that said vehicle is therefore of redundant configuration.

Embodiments of electronically controlled, in particular pneumatic, brake systems are known from the prior art.

Patent document EP 2 398 684 B1 discusses, for example, an electropneumatic brake system of a vehicle with separate pressure regulating channels.

Since doubling of the elements of existing brake systems is excessively expensive and complex, redundancy systems are to upgrade and/or supplement existing brake systems to the extent that a similar functionality (even restricted in some circumstances) is ensured in the case of a fault in comparison with fault-free operation. For autonomous driving operation, this means that an existing brake system has to be upgraded in such a way that an automated braking operation of the vehicle is also possible.

SUMMARY OF THE INVENTION

It is therefore an object of the present invention to provide a possibility to enable an existing electronically controlled brake system to be redundant for autonomous driving operation.

Said object may be achieved by the descriptions herein. Advantageous developments are the subject matter of the further descriptions herein.

Electronically controlled brake systems are generally believed to be understood. They may have a foot brake module and processing units (pressure regulating modules) for the generation of a pneumatic brake pressure. Here, the foot brake module electronically receives a driver's request, for example via a brake pedal, and forwards it electronically to a control apparatus which in turn thereupon actuates the processing units electronically. The processing units electronically generate a pneumatic brake pressure therefrom. To this end, the electronic generation of the brake pressure is supplied by way of a first, in particular electric, supply source. The foot brake module generates pneumatic control pressures from the movement of the brake pedal, even if there is no case of a fault. In this case, said pneumatic control pressures are not processed further. If the electric supply source fails, the brake system changes to a pneumatic fallback level. The pneumatic control pressures of the foot brake module are then utilized in a pneumatic fallback level to actuate the processing units, from which the latter generate brake pressures.

According to the invention, an apparatus is provided for the generation of non-electric, in particular pneumatic, control signals for a brake system, in particular an electronically controlled brake system, with a first, in particular electric, supply source. The apparatus has at least one interface which is configured to be connected to a pressure accumulator, and has at least one interface which is configured to output the control signals, the apparatus being configured to be supplied via a further supply source, in particular a battery circuit which is independent of the remaining brake system.

This advantageously ensures that control signals for the actuation of the brake system can still be generated even in the case of a failure of the supply of the supply source of the brake system, as a result of which autonomous driving operation can be carried out further.

The apparatus may have processing means, in particular electronic processing or control means, which are likewise supplied via the further supply source and which are configured to carry out the control operation of the apparatus and/or of the brake system, and/or which are of integral configuration with the apparatus.

This advantageously makes it possible that the apparatus generates the control signals for the brake system independently by means of the processing means.

Furthermore, at least one interface may be provided on the apparatus, in order to obtain a setpoint behavior, in particular a setpoint retardation of the vehicle, preferably in electronic form.

A specification of setpoint values is thus advantageously possible, in order for it to be possible for a desired retardation to be set even in the case of autonomous driving operation. The apparatus therefore provides a possibility of loading the brake system with a control signal even without electronic actuation.

The apparatus may be configured to generate the non-electric control signals, in particular the pneumatic control signals, in an electronically controlled manner.

Thus, an electronic specification of a setpoint behavior can advantageously still be converted into a brake signal even in the case of a redundancy.

According to the invention, a module is provided for the electronic generation of non-electric control signals for a brake system with a first supply source. The module has at least one interface which is configured to be connected to a pressure accumulator. The module has at least one interface which is configured to transfer the non-electric control signals, in particular pneumatic control signals, to at least one processing unit which is configured to generate brake pressures for the actuation of a brake from said non-electric control signals. Furthermore, at least one interface is provided which is configured to receive a non-electric control signal, the module being configured to generate the non-electric control signal for the brake system from said control signal.

Thus, a module, in particular a foot brake module, of an existing brake system can advantageously be upgraded, with the result that it receives non-electric, in particular pneumatic, control signals preferably of an apparatus according to the invention, as a result of which a conversion of its control signal is made possible in the brake system.

The module may have at least one interface which is configured to receive a driver's request, in particular via a brake pedal, the module being configured to take said driver's request into consideration in the case of the generation of the non-electric control signals for the brake system.

Therefore, a driver can advantageously also transmit a driver's request in the case of a redundancy to the brake system, in particular to the foot brake module, as a result of which it is ensured that even a brake input of a driver in the case of a redundancy is still converted into a vehicle retardation.

The module may be configured to be supplied via the second supply source.

The module may have a processing means, particularly an electronic processing means, which are likewise supplied via the further supply source, and which are configured to carry out the control operation of the apparatus, and/or of the module, and/or of the brake system.

It is thus ensured in the case of a redundancy that the control operation of the module and/or of the apparatus and/or of the brake system also takes place, with the result that further functionalities can be implemented even in the case of a redundancy.

The processing means may be configured integrally with the module.

The module may have an apparatus according to the invention, the interface for outputting the control signals being connected in terms of signal technology to the interface of the module for receiving a control signal.

Thus, the module can advantageously be controlled via the apparatus by means of non-electric, in particular pneumatic, signals.

The module and the apparatus are of integral or separate configuration.

In the case of an integral configuration, the interface for outputting control signals of the apparatus and the interface of the module for receiving the control signals may be identical.

The module may be configured, in a normal case, to determine a driver's request electronically and to transmit non-electric control signals to at least one processing unit, in particular pressure regulating modules, for the generation of brake pressures which are used only in the case of an electric fault, however.

The processing unit, in particular the pressure regulating module, may be configured to generate brake pressures pneumatically in the case of a failure of the electric supply.

The case of a fault may be a failure of a preferably electric first supply source of the module.

According to the invention, an electronic brake system is provided for a vehicle with at least two axles, in particular a commercial vehicle, which electronic brake system has at least one processing unit which is configured to generate brake pressures for the actuation of a brake from non-electric control signals, at least one non-electric, in particular pneumatic, circuit for the transmission of control signals to the at least one processing unit, and at least one pressure accumulator. Furthermore, processing means are provided which are configured to electronically control the generation of the brake pressures by way of the processing units, the processing means being supplied by way of a first supply source.

Furthermore, a module is provided which is connected fluidically to at least one pressure accumulator by way of the at least one interface for connection to a pressure accumulator, and which is connected to the at least one non-electric circuit by way of the at least one interface for outputting the non-electric, in particular pneumatic, control signals.

A processing unit, in particular a pressure regulating module, may be in each case connected to a separate non-electric, preferably pneumatic, circuit, and is configured to be actuated separately via the at least one interface for outputting the non-electric, in particular pneumatic, control signals of the module, a processing unit generating brake pressures for an axle, in particular brakes of an axle of the vehicle.

Thus, pneumatic control signals can advantageously be transmitted to the processing units, particularly preferably separately for each axle, as a result of which an at least axle-by-axle transmission of the pneumatic control signals is made possible.

Furthermore, a processing unit may be provided which is configured to generate brake pressures for the actuation of a brake of at least one trailer from non-electric control signals.

The processing unit may be connected to a non-electric circuit which is either a separate circuit, or which is connected to at least one further processing unit.

Furthermore, a second, in particular electric, supply source, for example a battery circuit, may be provided in the brake system.

A second, redundant energy supply is thus made possible.

At least one modulator, in particular a pressure control valve, may be provided, which is provided in at least one non-electric circuit and is configured to preferably electronically modulate the corresponding non-electric, in particular pneumatic, control signal to the corresponding processing unit.

Said modulator may be configured to be actuated electronically by way of a processing means which is supplied by way of the first supply source, said modulator being configured at the same time to be actuated electronically by way of a processing means which is supplied by way of the second supply source. As a result, said modulator can advantageously still be controlled electronically even in the case of a fault, as a result of which an electronic modulation of the control pressure for brakes on the front axle and/or rear axle and/or trailer module becomes possible.

There may be at least one modulator which is configured to electronically modulate a brake pressure which is generated by a processing unit and which is transmitted to a brake. Said modulator may be connected fluidically to a processing unit and at least one wheel brake.

Said modulator may be configured to be actuated electronically by way of a processing means which is supplied by way of the first supply source, said modulator being configured at the same time to be actuated electronically by way of a processing means which is supplied by way of the second supply source.

It is thus advantageously achieved that the brake pressure which may be transmitted in an axle-by-axle manner, and particularly preferably to the individual brakes, or in a combination thereof, can still be modulated in an electronically controlled manner even in the case of a fault.

In the case of modulators which are provided individually for each wheel, wheel-individual control operation of the brake pressure is still possible even in the case of a fault, as a result of which no functional restriction of the brake system is as a rule set in the case of a fault.

Furthermore, the brake system may have an apparatus according to the invention which is connected by way of its at least one interface for outputting the control signal for the brake system to the at least one interface of the module according to the invention, in particular the foot brake module, preferably the control input.

Furthermore, the apparatus is connected fluidically by way of the at least one interface to a pressure accumulator.

Processing means, in particular electronic processing means, may be provided which are configured to electronically control the generation of the brake pressures. The processing means may be configured to electronically carry out the control operation of the apparatus and/or the modulators, the apparatus and/or the processing means being configured to be supplied by way of the further supply source and/or to receive a setpoint behavior, preferably a setpoint retardation in the case of a fault, and thereupon to control the system.

The electronic brake system may have at least one interface which is configured to detect wheel rotational speeds of at least one wheel, the brake system being configured to carry out the generation of the brake pressures with consideration of the detected wheel rotational speeds, in particular by way of the processing means.

Here, part, particularly which may be half, of the wheel rotational speeds are advantageously detected by way of wheel rotational speed sensors which are supplied by way of the first supply source, the other part, preferably the other half, being detected by way of wheel rotational speed sensors which are supplied by way of the second supply source. Thus, rotational speed signals are still available even in the case of a failure of a supply source, in order for it to be possible for a brake regulation to be carried out on the basis of said values.

At least one wheel rotational speed per axle of the vehicle or at least one wheel rotational speed of a trailer may be detected by way of a sensor which is supplied by way of the first supply source, and at least one wheel rotational speed per axle of the vehicle or at least one wheel rotational speed of a trailer is detected by way of a sensor which is supplied by way of the second supply source.

The electronic brake system may have a processing means which is supplied by way of the first supply source, and a processing means which is supplied by way of the second supply source, the two processing means detecting wheel rotational speeds of the at least one wheel via the at least one interface.

It is thus advantageously ensured that all the wheel rotational speed signals are nevertheless still available even in the case of a fault, in which a supply source, in particular the first supply source, has failed.

It is then possible by way of the above-described apparatus, the module and the electronic brake system to configure a redundant electronically controlled brake system. Further embodiments can be obtained, however, by at least two above-described features being combined with one another.

The present application discloses a redundant electronically controlled brake system, in which non-electric control signals are used in part for the control of components. Since the application is concerned with the development of an electronic brake system for commercial vehicles which typically has a pneumatic fallback level, the non-electric control signals are, in particular, of pneumatic configuration. A pressure accumulator is therefore also to be considered to be a pneumatic pressure accumulator, that is to say a compressed air store.

In addition, however, embodiments are conceivable which utilize a different gaseous medium than air for the transmission of signals, or which instead transmit signals along a hydraulic path.

The redundancy of the described brake system is achieved by virtue of the fact that there are still further supplied elements even in the case of a failure of the first supply source of the brake system, which supplied elements still make a control operation possible, even if in a restricted manner. It is possible by way of the use of two pressure control valves to realize an axle-by-axle electronically controlled regulation of the brake pressures; if further pressure control valves are added, a wheel-individual regulation or regulation for a trailer in the form of an intermittent brake can also be implemented.

The regulating method can be operated, for example, in accordance with various approaches which can be changed in a selected manner depending on the driving situation. In a "select-smart" regulating method, it is possible to realize as short a braking distance as possible by way of a brake operation of the redundancy system. Here, the brake pressure may be regulated electronically in an axle-by-axle manner on the basis of the received wheel rotational speed signals in such a way that as high a retardation of the vehicle as possible is set. Here, the wheels are braked in such a way that they are kept close to the locking limit, at which the wheel would slide over the roadway without rolling further. In contrast to this, optimum stability can be achieved during the brake operation by way of a "select-low" regulating method. Here, the brake pressure may be regulated electronically in an axle-by-axle manner on the basis of the received wheel rotational speed signals in such a way that a brake operation which is as stable as possible of the vehicle is set. To this end, the wheels may be braked in such a way that they as far as possible do not reach the locking limit. In addition, it can be ensured that, for example, the front axle is always over braked before the rear axle, that is to say the front axle is the first to begin to lock. The selection of the axle-by-axle regulating method may be dependent on the driving situation: "select-smart" may be applied in the case of stable driving in order to achieve braking distances which are as short as possible, and "select-low" may be applied in the case of unstable driving, in the case of which, for example, swerving of the vehicle is to be prevented.

In the following text, the invention is described on the basis of preferred exemplary embodiments with reference to the appended drawings.

DETAILED DESCRIPTION

Figure 1:
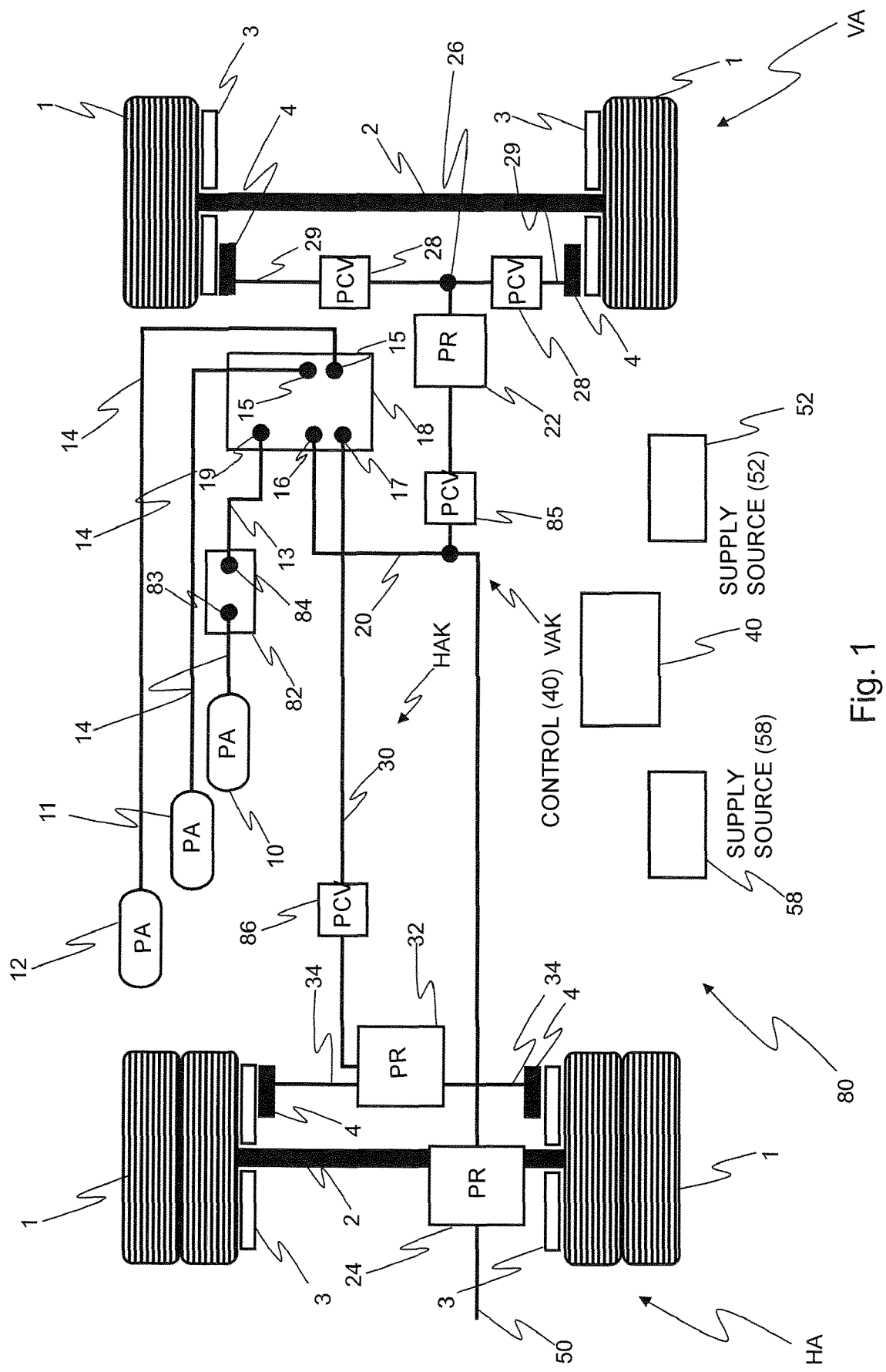
FIG. 1 shows a view of an electronic brake system (EBS) according to the invention.

FIG. 1 shows a view of an electronic brake system 80 (EBS) according to the invention. A front axle VA and a rear axle HA are shown which in each case have wheels 1 which are fastened rotatably to an axle 2. The wheels 1 are in each case assigned a brake device which is configured as a friction brake in the example which is shown. To this end, a brake disk 3 is provided at each wheel 1, which brake disk 3 is configured to enter into frictional contact with a frictional partner, in this case a brake lining 4. The brake disk 3 is connected fixedly to the respective wheel 1 so as to rotate with it, and therefore rotates with the wheel 1 during driving.

In order to carry out a brake operation, the respective brake lining 4 is brought into contact with the corresponding brake disk 3 by way of an introduced brake pressure, as a result of which a frictional force is set on the brake disk 3, which frictional force results in a braking moment which acts counter to the rotational movement of the brake disk 3 and, in particular, the wheel 1.

The illustration of further components of the vehicle and, in particular, the axle construction and/or the construction of the brakes has been dispensed with in this illustration for reasons of clarity.

Furthermore, a brake construction and vehicle construction of this type are not to be considered restrictive for the subject matter of the invention. It serves merely as an example, in order to clarify the method of operation of the subject matter according to the invention. Rather, alternative structural possibilities of a brake are also conceivable, such as a drum brake instead of the disk brake which is shown. Further embodiments of a vehicle are also conceivable. Thus, for example, more than one front axle VA or rear axle HA might be provided.

Furthermore, a plurality of components of an electronic brake system are shown, as are used for carrying out the brake operation of the vehicle in the case of vehicles, in particular commercial vehicles.

A first pressure accumulator 10, a second pressure accumulator 11 and a third pressure accumulator 12 are shown which are provided for storing compressed air. They are connected via the supply lines (not shown) to pressure regulating modules 22, 24, 32 and supply the latter with compressed air. The pressure regulating modules 22, 24, 32 are, for example, a single-channel electropneumatic pressure regulating module 22, a dual-channel electropneumatic pressure regulating module 32, and a trailer module 24 for possible trailer operation. Furthermore, pressure control valves (modulators) 28 are provided on the front axle VA which are connected via a line 26 to the pressure regulating module 22. Brake pressures are generated by way of the pressure regulating module 22 via the line 26 for the front axle VA, and subsequently in a wheel-individual manner by way of the pressure control valves 28 via the lines 29 and by way of the pressure regulating module 32 in a wheel-individual manner via the lines 34 for the rear axle HA. The trailer module 24 generates brake pressures for a possibly present trailer and transmits them via the line 50.

Furthermore, an apparatus 82 is shown which is connected fluidically by way of an interface 83 via a supply line 14 to a pressure accumulator 10. The apparatus 82 which is shown is configured to generate pneumatic control signals from compressed air of the pressure accumulator 10, in particular in the case of autonomous driving operation of the vehicle, for the brake system 80. Said control signals can be made available to the brake system 80 via a further interface 84 of the apparatus 82.

For this purpose, the interface 84 is connected via a control line 13 to a control input of a foot brake module 18. In addition, the foot brake module 18 has, for example, an interface (not shown) to a driver, in order to receive his/her inputs, in particular brake inputs.

In addition, the foot brake module 18 has inputs which are configured to receive compressed air via control lines 14 from the second pressure accumulator 11 and the third pressure accumulator 12. The foot brake module 18 is configured to generate pneumatic control signals for the brake system 80 from control inputs of a driver and/or from control signals which are received via the control input 19. The control signals are configured for a dual-circuit brake system 80 in the embodiment which is shown.

The first circuit, the front axle circuit VAK, is supplied with pneumatic control signals via an output 16 of the foot brake module 18. Here, the first circuit is formed by way of the control line 20 which branches off to the front axle VA and to the trailer module 24, the pressure regulating module 22, the line 26 which branches off to the two wheels 1 of the front axle VA, the pressure control valves 28, the lines 29, the trailer module 24 and the line 50. In the first circuit, a pressure control valve 85 is provided downstream of the branch of the control line 20 in the direction of the front axle VA upstream of the pressure regulating module 22, which pressure control valve 85 is configured to modulate the pneumatic control pressure to the pressure regulating module 22.

The second circuit, the rear axle circuit HAK, is supplied with pneumatic control signals via an output 17 of the foot brake module 18. Here, the second circuit is formed by way of the control line 30, the pressure regulating module 32 and the lines 34. In addition, a pressure control valve 86 is provided in the control line 30 between the output 17 and the pressure regulating module 32, which pressure control valve 86 is configured to modulate the pneumatic control pressure to the pressure regulating module 32.

Furthermore, a control apparatus 40, for example an electronic control unit, is provided which is connected electronically to elements of the EBS 80 and is configured for the electronic control of the EBS 80. As a basis for the electronic control operation, the control apparatus 40 receives, for example, a setpoint value, for example a setpoint retardation, of the vehicle. The illustration of the electronic connections has been dispensed with in all drawings for reasons of clarity. Said electronically controlled part of the EBS 80 is supplied via a first supply source 52 which takes over the energy supply, for example as a battery circuit.

In detail, the control apparatus 40 is connected to the foot brake module 18, the pressure regulating modules 22, 24, 32 and the pressure control valves 28, and receives information from them with respect to the state and/or operation of the brake system 80 and/or can control the latter. The control apparatus 40 forms an electronic control level with said components of the EBS 80 which is shown, which electronic control level is supplied via a first supply source 52. Here, the pressure control valves 28 are not supplied by way of the first supply source 52, but rather are activated merely by way of control signals and are otherwise of passive configuration.

Furthermore, a second supply source 58 is provided which supplies the apparatus 82. This means that the apparatus 82 is supplied independently of the first supply source 52. The apparatus 82, the pressure control valves 85, 86 and the second supply source 58 form the electronically controlled part of a redundancy level of the EBS 80.

In addition, the EBS 80 has the possibility of determining rotational speed signals of the wheels 1. This can take place, for example, via rotational speed sensors (not shown) which determine the wheel rotational speed in a wheel-individual manner.

Said rotational speed signals are transmitted, for example, electronically to the control apparatus 40 or further suitable elements of the EBS 80, in order for it to be possible for the brake pressures to be set in accordance with a wheel slip which is produced.

Here, the EBS 80 is configured in such a way that part of the wheel rotational speeds, for example at least one signal per axle, are determined by way of sensors or elements such as processing means which are supplied by way of the first supply source 52, and another part of the wheel rotational speeds, for example at least one signal per axle, are determined by way of sensors or elements such as processing means which are supplied by way of the second supply source 58. A redundant embodiment of the EBS 80 is thus ensured, and wheel rotational speeds of all axles of the vehicle can still be determined even in the case of the failure of a supply source 52, 58.

The EBS 80 has a pneumatic fallback level for the case where the supply from the first supply source 52 is no longer ensured. To this end, the pressure regulating modules 22, 24, 32, the foot brake module 18 and the pressure control valves 28 enable their pneumatic fallback level in the case of the failure of the first supply source 52. That is to say, they are configured to receive or to generate pneumatic control signals, in order thus to further ensure operation of the EBS 80.

The foot brake module 18 is configured to provide pneumatic control signals for the two above-described circuits VAK, HAK by means of the compressed air from the pressure accumulators 11, 12 from driver inputs or from control signals which are received via the control input 19. Said pneumatic control signals are output by way of the foot brake module 18 even in a normal case, but are not processed further in the pressure regulating modules 22, 24, 32.

The pressure regulating modules 22, 24, 32 are configured to generate brake pressures from the received pneumatic control pressures by means of the compressed air from the pressure accumulators 11, 12 in the case of a failure of the first supply source 52.

The pressure control valves 28 likewise have a pneumatic fallback level and act, for example, in a limiting manner on the brake pressure in the line 26, or allow said brake pressure to pass unchanged into the lines 29.

After the description of the fundamental construction of the EBS 80, the description of the method of operation of the EBS 80 now takes place in the further text.

In the normal case, that is to say in the case of fault-free operation, driver inputs, or inputs of a control apparatus 40 in the case of autonomous driving operation, are received by way of the foot brake module 18 and are processed electronically by way of the control apparatus 40. From said inputs, the control apparatus 40 determines brake pressures for the individual axles VA, HA and for a coupled trailer. Said brake pressures are transmitted electronically to the pressure regulating modules 22, 24, 32, which generate said brake pressures, as described above, with the aid of the compressed air from the pressure accumulators 11, 12.

The brake system 80 which is shown is configured, in the normal case, to modulate the applied brake pressures via the pressure regulating modules 22, 24, 32 and with consideration of the wheel rotational speeds in an electronically controlled manner, in such a way that, in the case of a brake operation, the vehicle is firstly kept stable in terms of driving dynamics, and secondly a retardation which is as high as possible is applied to the vehicle, with the result that a braking distance which is as short as possible is set.

In the further text, the description of the method of operation of the EBS 80 takes place in the case of the occurrence of the case of a fault, more precisely in the case of a failure of the first supply source 52.

If, for example, the electric supply from the supply source 52 fails, an electronic control operation of the EBS 80, as described above, is no longer possible. The pressure regulating modules 22, 24, 32 and the foot brake module 18 then enable their pneumatic fallback level.

Furthermore, however, the apparatus 82 is supplied by way of the second supply source 58 which actuates that the two pressure control valves 85, 86 electronically, as a result of which, furthermore, electronically controlled operation of the EBS 80 is possible, even if with restricted functionality.

The apparatus 82 produces pneumatic control signals for a brake operation of the vehicle in an electronically controlled manner in the case of autonomous driving operation from setpoint specifications, for example a setpoint retardation, with the aid of compressed air from the first pressure accumulator 10. Here, the electronic control operation can take place by way of a control means which has the apparatus 82, or which is connected in terms of signal technology to the apparatus 82.

The generated pneumatic control signal is transmitted via the control line 13 to the control input 19 of the foot brake module 18. From said control signal, the foot brake module 18 generates pneumatic control signals or control pressures and transmits them to the two control lines 20, 30. Furthermore, the foot brake module 18 also generates pneumatic control signals from driver inputs, for example, via a brake pedal.

In the two circuits VAK, HAK, the pneumatic control signals are received by the pressure control valves 85, 86. The latter then modulate the received control signals in a manner which is controlled electronically by way of the apparatus 82.

Here, the modulation of the pneumatic control signals takes place on the basis of the received wheel rotational speeds which are still at least partially available even in the case of a fault. On account of the arrangement of the pressure control valves 85, 86, the modulation in the embodiment which is shown can take place in an axle-by-axle manner for the front axle VA and the rear axle HA. A wheel-individual modulation is not possible in said fallback level. In this way, the vehicle can still be braked and/or stabilized in an electronically controlled manner even in the case of a fault.

In the embodiment which is shown, the brake pressure for a trailer which is supplied with brake pressure via the line 50 is not influenced by way of an upstream pressure control valve 85, 86. That is to say, in said embodiment, no influencing of the brake pressure of a trailer can be implemented in the case of a failure of the first supply source 52, which can result in disadvantages with regard to driving stability and braking distance.

Figure 2:
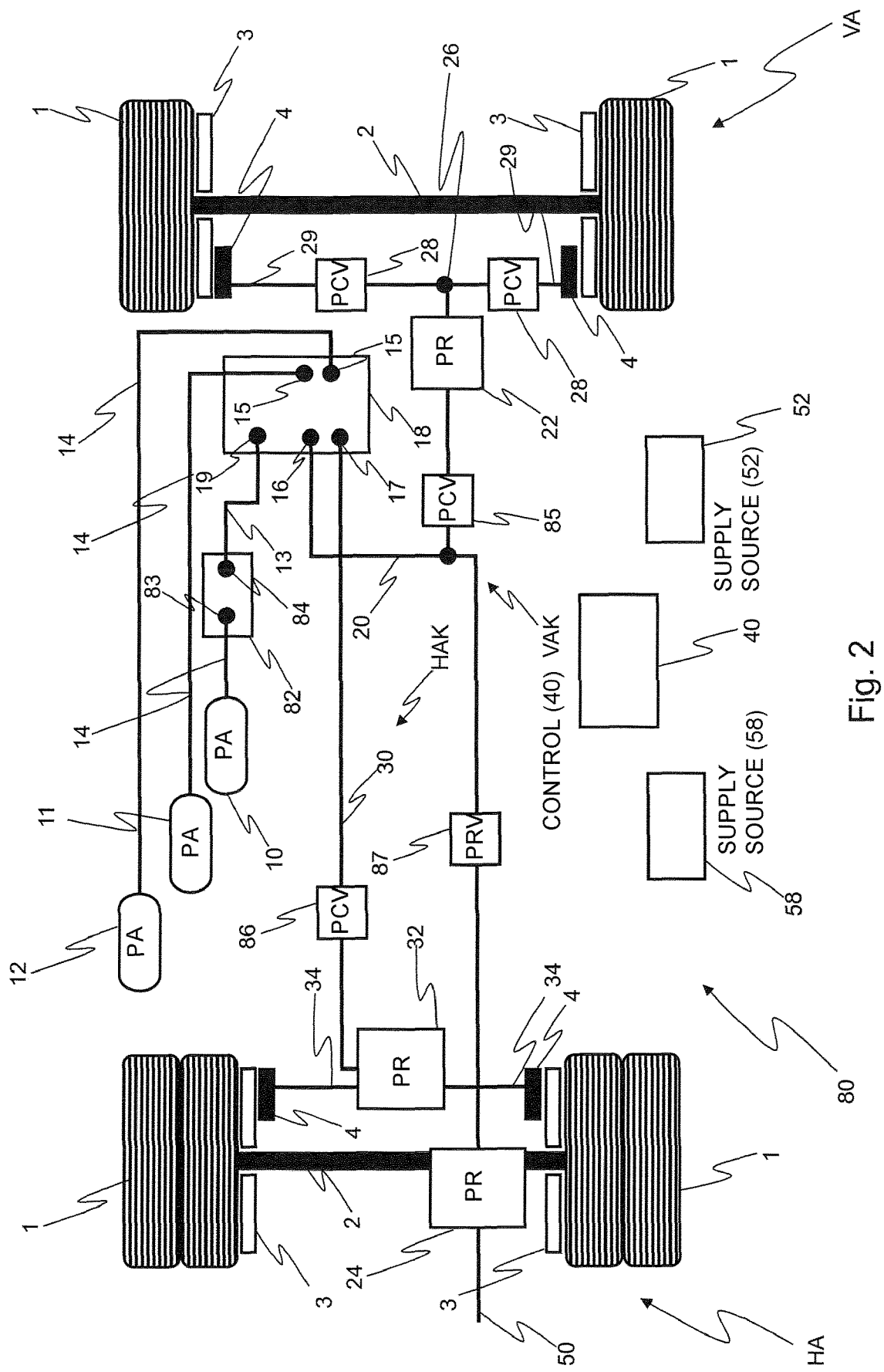
FIG. 2 shows one development of the electronic brake system from FIG. 1.

FIG. 2 shows one development of the electronic brake system 80 from FIG. 1.

Here, in contrast to the embodiment in FIG. 1, a pressure regulating valve 87 has also been provided upstream of the trailer module 24 in the control line 20 in that section which branches off to the trailer module 24, which pressure regulating valve 87 is likewise controlled electronically by way of processing means, for example the apparatus 82, the latter being supplied by way of the second supply source 58. The construction and the method of operation of the remaining brake system 80 are substantially identical to the embodiment from FIG. 1.

It is then possible by way of the pressure regulating valve 87 upstream of the trailer module 24 to also electronically modulate the control pressure which is transmitted to the trailer module 24. Thus, for example, locking of the wheels of a trailer which obtains a brake pressure via the line 50 can be prevented by the control pressure being reduced accordingly by way of the pressure regulating valve upstream of the trailer module 24. At the same time, however, the control pressure which is conducted via the control line 20 to the front axle VA is not influenced as a result, since the control pressure is modulated here independently thereof by way of the pressure regulating module 85.

Thus, in a pneumatic fallback level of the brake system 80 which is shown, an axle-by-axle realization of an ABS function for the vehicle and a realization of an intermittent brake for a trailer can take place.

Figure 3:
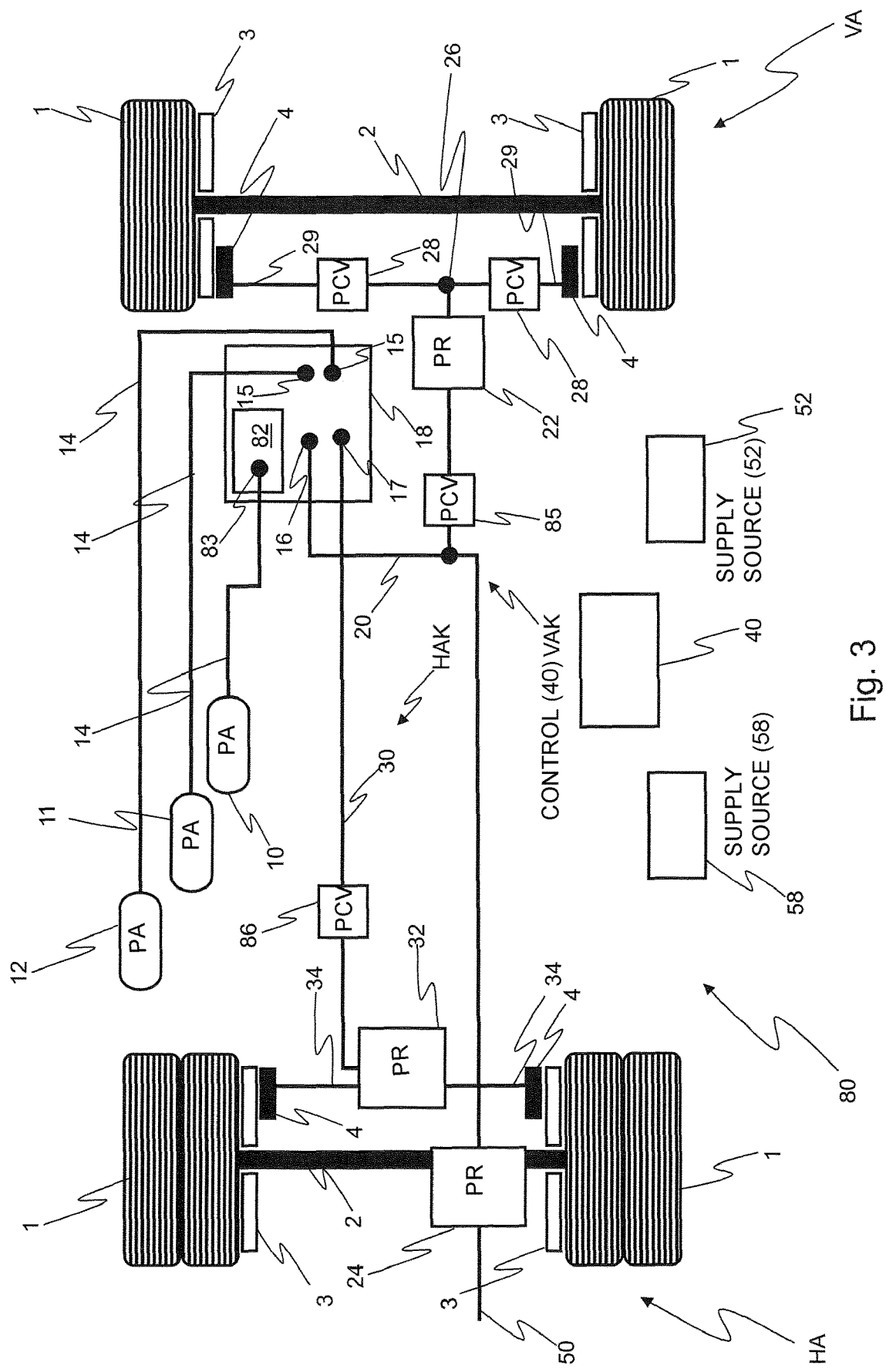
FIG. 3 shows a view of an electronic brake system (EBS) according to the invention.

FIG. 3 shows an electronic brake system 80, in the case of which the apparatus 82 has been integrated into the module 18.

In this way, control lines 13 between the apparatus 82 and the module 18 can be shortened or can even be dispensed with, which results in shorter response times in the case of the implementation of the control signals of the apparatus 82 by way of the module 18. In addition, the complexity of the brake system 80 can also be reduced as a result.

The further construction and the method of operation of the brake system 80 correspond substantially to the embodiment from FIG. 1, for which reason said embodiment will not be described further here.

Figure 4:
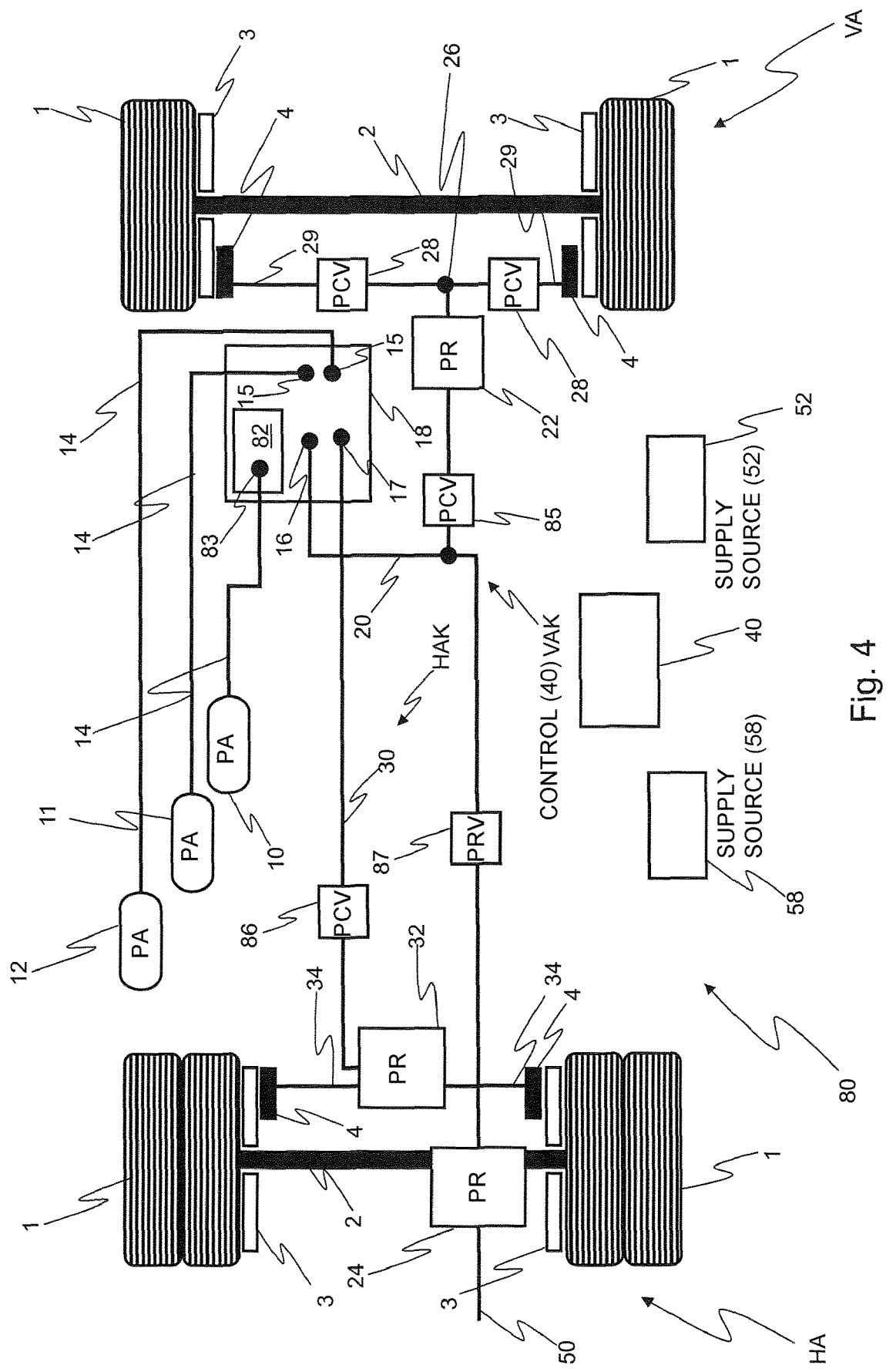
FIG. 4 shows one development of the electronic brake system from FIG. 3.

FIG. 4 shows one development of the brake system 80 from FIG. 3.

In contrast to the embodiment from FIG. 3, an additional modulator 87 was inserted here, precisely as in FIG. 2, into that part of the control line 20 which branches off to the trailer module 24, as a result of which a possibility is also provided here of changing the control pressure to the trailer module 24, as a result of which an intermittent brake for a trailer can be realized.

The further construction and method of operation of the brake system 80 correspond substantially to the embodiment from FIG. 3, for which reason said embodiment will not be described further here.

Figure 5:
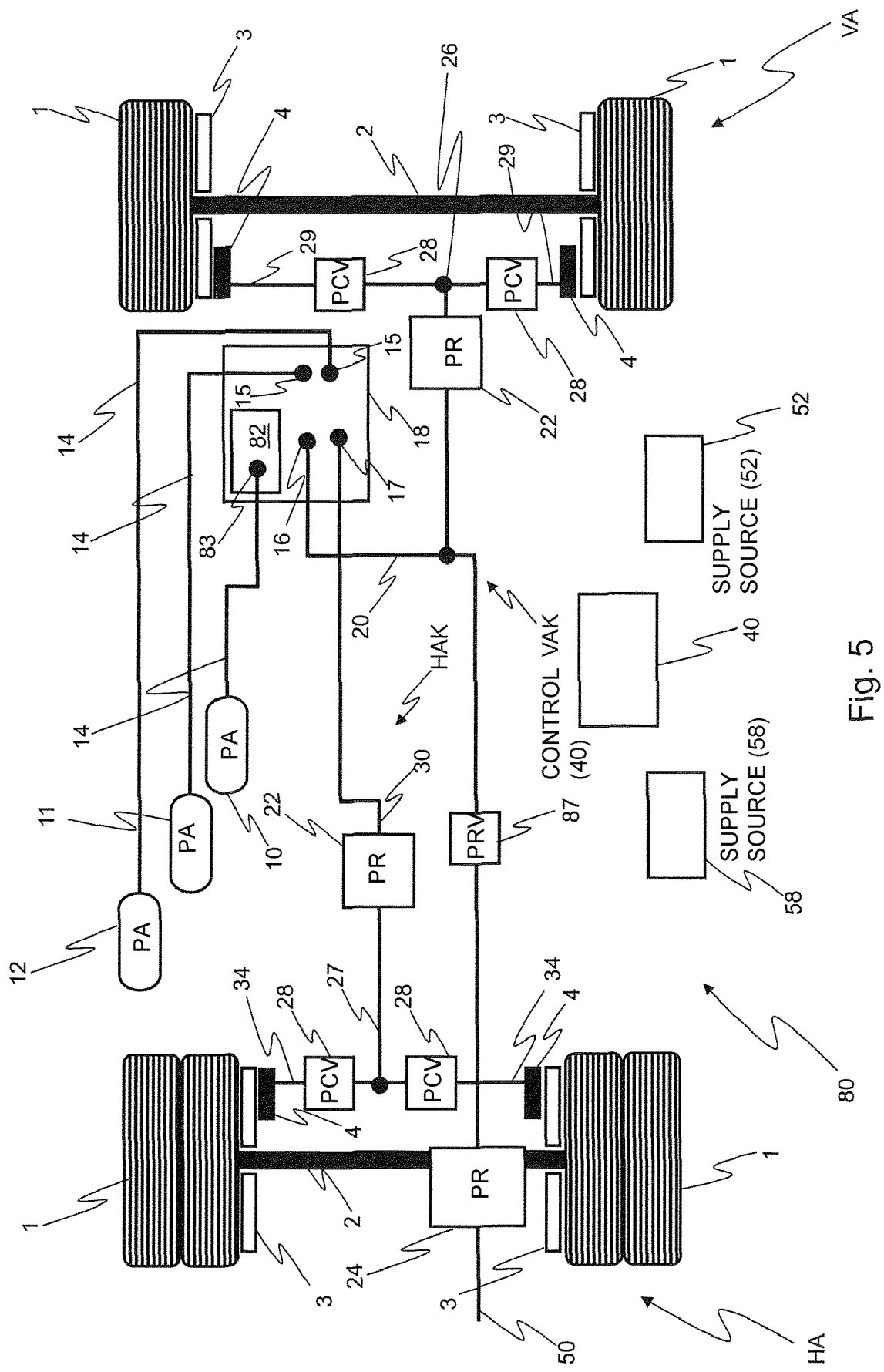
FIG. 5 shows a further embodiment of an electronic brake system (EBS) according to the invention.

FIG. 5 shows a further embodiment of the electronic brake system 80 according to the invention.

Instead of the pressure regulating module 32 which provides brake pressures to the two lines 34, the same construction has been provided here at the rear axle HA as at the front axle VA. A further pressure regulating module 22 then receives pneumatic control signals via the control line 30 from the output 17 of the module 18. The pressure regulating module 22 is configured to produce brake pressures on the basis of the control signals from the output 17, which brake pressures are transmitted via the branching line 27 to the pressure control valves 28. The pressure control valves 28 are configured to forward the brake pressures to the lines 34 in a manner which is modulated so as to actuate the brakes of the wheels 1 accordingly.

Otherwise, the pressure control valves 85, 86 which were provided for the modulation of the pneumatic control signal in the lines 20, 30 have been dispensed with.

Instead, the pressure control valves 28 are now used to this end. To this end, they are actuated electronically by way of a processing means which is provided, for example, in the apparatus 82 and which is supplied by way of the second supply source 58, in addition to a first processing means, for example the control apparatus 40 which is supplied by way of the first supply source 52.

The brake system 80 is configured to be controlled electronically by way of processing means of the apparatus 82 or the module 18 in the case of a fault. Said apparatus 82 and module 18 are supplied electrically by way of the second supply source 58.

Thus, the processing means which are still supplied in the case of a fault can actuate the pressure control valves 28 for the modulation of the brake pressure in the lines 29, 34, and can therefore perform a wheel-individual control operation of the brake pressure.

Therefore, the pressure control valves 85, 86 can be dispensed with in said embodiment. In order to implement an intermittent brake on a trailer, the pressure control valve 87 would be provided in said embodiment for the modulation of the control pressure for the trailer module 24, in a comparable manner with respect to the embodiments from FIG. 2 and FIG. 4.

Figure 6:
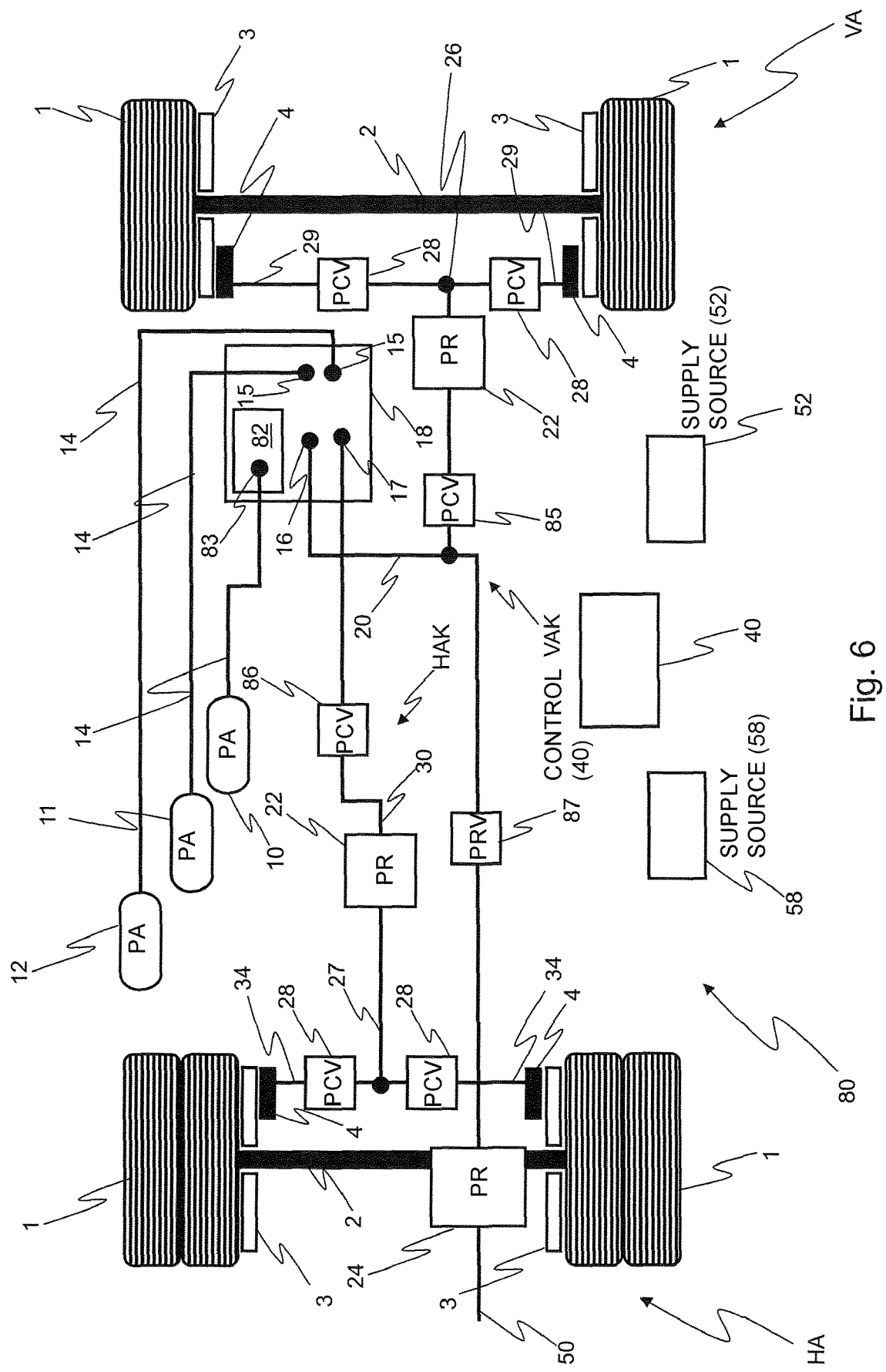
FIG. 6 shows a further embodiment of an electronic brake system (EBS) according to the invention.

FIG. 6 shows a further embodiment of the electronic brake system 80 according to the invention.

The construction of the brake system 80 which is shown is substantially comparable with the construction of the brake system 80 from FIG. 5. Here, however, the pressure control valves 28 are not actuated by way of processing means which are supplied by way of the second supply source 58, but rather by way of processing means which are supplied by way of the first supply source 52. That is to say, a wheel-individual modulation of the brake pressure by way of the pressure control valves 28 is no longer possible in the case of a failure of the first supply source 52.

Therefore, processing means are provided in said embodiment which are supplied by way of the second supply source 58 and actuate the pressure control valves 85, 86 in the lines 20, 30, in order to modulate the pneumatic control pressures from the outputs 16, 17 of the module 18 in an electronically controlled manner. As a result, said embodiment makes an axle-by-axle modulation of the brake pressures by way of modulation of the control pressures possible.

The described embodiments show an electronically controlled brake system, or a module and an apparatus which provide pneumatic control and brake pressures on a fallback level. Said embodiments do not have a restrictive effect on the subject matter of the invention. Rather, further embodiments are conceivable, in which control signals and/or brake pressures are of a hydraulic nature. In a further embodiment, brake actuations and/or control signals of a mechanical nature are also provided. Further embodiments can be formed by way of a combination of the above-described embodiments. Furthermore, embodiments can be formed by, for example, the pressure accumulators 10, 11, 12 being combined, with the result that, for example, the apparatus 82 and the module 18 obtain compressed air from merely one pressure accumulator.

THE LIST OF DESIGNATIONS IS AS FOLLOWS

1 Wheel
2 Axle
3 Brake disk
4 Brake lining
10 First pressure accumulator (compressed air source)
11 Second pressure accumulator (compressed air source)
12 Third pressure accumulator (compressed air source)
13 Control line
14 Supply line
15 Input, foot brake module (interface)
16 Output, foot brake module (interface, VA)
17 Output, foot brake module (interface, HA)
18 Foot brake module (module)
19 Control input, foot brake module (interface)
20 Control line 22 Pressure regulating module (processing unit, single-channel)
24 Trailer module (processing unit)
26 Line
27 Line
28 Pressure control valve (modulator)
29 Line
30 Control line
32 Pressure regulating module (processing unit, dual-channel)
34 Line
40 EBS control unit (control apparatus)
50 Line
52 First supply source
58 Second supply source
80 Brake system
82 Apparatus
83 Input, apparatus (interface)
84 Output, apparatus (interface)
85 Pressure control valve (modulator)
86 Pressure control valve (modulator)
87 Pressure control valve (modulator)
HAK Rear axle circuit
VAK Front axle circuit
HA Rear axle
VA Front axle

The invention claimed is:

1. An apparatus for generating non-electric control signals for an electronic brake system (EBS), which has a first supply source, comprising:
    at least one interface configured to be connected to a plurality of pressure accumulators; and
    at least one other interface to output the control signals;
    wherein the apparatus is configured to be supplied via a second supply source,
    wherein the apparatus is connected fluidically by the at least one interface via a supply line to the pressure accumulator, wherein the apparatus is configured to generate pneumatic control signals from compressed air of the pressure accumulator, including for autonomous driving operation of the vehicle, for the electronic brake system, wherein the pneumatic control signals are made available to the electronic brake system via the at least one other interface,
    wherein the apparatus is connected to a foot brake module, pressure regulating modules and pressure control valves, and receives information on a state and/or operation of the electronic brake system, wherein the second supply source supplies the apparatus independently of the first supply source, wherein the apparatus, the pressure control valves and the second supply source form an electronically controlled part of a redundancy level of the EBS, and
    wherein the EBS has a pneumatic fallback level for when there is a failure of the first supply source, wherein the pressure regulating modules, the foot brake module and the pressure control valves enable the pneumatic fallback for the failure of the first supply source, so that the pressure regulating modules are configured to receive or to generate pneumatic control signals, so as to ensure operation of the EBS,
    wherein a front axle circuit includes front axle pressure control valves, each of which controls a front wheel brake, wherein a front axle pressure regulating module is coupled between the front axle pressure control valves, and wherein a front axle pressure control valve is coupled in line with the front axle pressure regulating module,
    wherein a rear axle circuit, which includes a rear axle pressure regulating module coupled to at least one rear axle pressure control valve, is coupled to rear wheel brakes,
    wherein a trailer circuit includes a trailer pressure regulator of a trailer module, which is coupled to a trailer pressure regulating valve, which is coupled to the front axle pressure control valve,
    wherein the pressure accumulators are coupled to the foot brake module, which is coupled to: (i) the front axle pressure control valve, (ii) the rear axle pressure regulating module or the at least one rear axle pressure control valve, and (iii) the trailer pressure regulator of the trailer module.

2. The apparatus of claim 1, further comprising:
    an electronic control unit, which is supplied via the second supply source, to carry out a control operation of the apparatus and/or the electronic brake system, and/or which is integrated into the apparatus.

3. The apparatus of claim 1, further comprising:
    at least one further interface, to obtain a setpoint behavior, which is a setpoint retardation of the vehicle.

4. The apparatus of claim 1, wherein the apparatus is configured to generate the non-electric control signals in an electronically controlled manner.

5. A module for electronically generating non-electric control signals for an electronic brake system (EBS), which has a first supply source, comprising:
    at least one interface configured to be connected to a pressure accumulator;
    at least one other interface to transmit the non-electric control signals to at least one electronic control unit, which is configured to generate brake pressures for actuating a brake from the non-electric control signals; and
    at least one further interface to receive a non-electric control signal;
    wherein the module is configured to generate the non-electric control signals for the electronic brake system from said control signal,
    wherein the at least one interface is connected fluidically via a supply line to the pressure accumulator, for generating pneumatic control signals from compressed air of the pressure accumulator, including for autonomous driving operation of the vehicle, for the electronic brake system, wherein the pneumatic control signals are made available to the electronic brake system via the at least one other interface,
    wherein there is a foot brake module, pressure regulating modules and pressure control valves, and information is received on a state and/or operation of the electronic brake system, wherein a second supply source operates independently of the first supply source, wherein the pressure control valves and the second supply source form an electronically controlled part of a redundancy level of the EBS, and
    wherein the EBS has a pneumatic fallback level for when there is a failure of the first supply source, wherein the pressure regulating modules, the foot brake module and the pressure control valves enable the pneumatic fallback for the failure of the first supply source, so that the pressure regulating modules are configured to receive or to generate pneumatic control signals, so as to ensure operation of the EBS, wherein a front axle circuit includes front axle pressure control valves, each of which controls a front wheel brake, wherein a front axle pressure regulating module is coupled between the front axle pressure control valves, and wherein a front axle pressure control valve is coupled in line with the front axle pressure regulating module, wherein a rear axle circuit, which includes a rear axle pressure regulating module coupled to at least one rear axle pressure control valve, is coupled to rear wheel brakes, wherein a trailer circuit includes a trailer pressure regulator of a trailer module, which is coupled to a trailer pressure regulating valve, which is coupled to the front axle pressure control valve, wherein the pressure accumulators are coupled to the foot brake module, which is coupled to: (i) the front axle pressure control valve, (ii) the rear axle pressure regulating module or the at least one rear axle pressure control valve, and (iii) the trailer pressure regulator of the trailer module.

6. The module of claim 5, wherein the at least one further interface is configured to receive a driver's request, and wherein the module is configured to take the driver's request into consideration in the case of the generation of the non-electric control signals for the brake system, and/or to be supplied via the first supply source and/or the second supply source.

7. The module of claim 6, wherein the module is configured, in a normal case, to determine the driver's request electronically, to forward it to a control apparatus, and to additionally transmit non-electric control signals to the at least one electronic control unit for generating brake pressures which are used only in the case of a fault.

8. The module of claim 7, wherein the fault includes a failure of a supply of the module, by the first supply source.

9. The module of claim 5, wherein the electronic control unit is supplied via the second supply source, to control operation of the apparatus, and/or the module, and/or the electronic brake system, and/or which is integrated into the module.

10. The module of claim 5, further comprising:
an apparatus for generating non-electric control signals for the electronic brake system, which has the first supply source, including: the at least one interface configured to be connected to the pressure accumulator, and the at least one other interface to output the control signals, wherein the apparatus is configured to be supplied via the second supply source;
wherein the at least one further interface is connected to the interface of the module for the transmission of signals, and
wherein the apparatus is configured so as to be integrated into the module or so as to be separate.

11. The module of claim 10, wherein the at least one other interface is the same as the at least one further interface in an integrated configuration.

12. An electronic brake system (EBS) for a vehicle with at least two axles, the vehicle being a commercial vehicle, comprising:
at least one electronic control unit to generate brake pressures for the actuation of a brake from non-electric control signals;
at least one non-electric, pneumatic, circuit for transmitting control signals to the at least one electronic control unit;

wherein the electronic control unit is configured to electronically control the generating of the brake pressures supplied by a first supply source;
at least one pressure accumulator;
a module for electronically generating non-electric control signals for the electronic brake system, which has the first supply source, including:
at least one interface configured to be connected to the at least one pressure accumulator;
at least one other interface to transmit the non-electric control signals to the at least one electronic control unit, which is configured to generate brake pressures for actuating the brake from the non-electric control signals; and
at least one further interface to receive the non-electric control signals;
wherein the module is configured to generate the non-electric control signals for the electronic brake system from said control signal;
wherein the module is connected fluidically by the at least one interface to the at least one pressure accumulator, and which is connected fluidically via the at least one other interface to the at least one non-electric circuit,
wherein the apparatus is connected fluidically by the at least one interface via a supply line to the pressure accumulator, wherein the apparatus is configured to generate pneumatic control signals from compressed air of the pressure accumulator, including for autonomous driving operation of the vehicle, for the electronic brake system, wherein the pneumatic control signals are made available to the electronic brake system via the at least one other interface,
wherein the apparatus is connected to a foot brake module, pressure regulating modules and pressure control valves, and receives information on a state and/or operation of the electronic brake system, wherein a second supply source supplies the apparatus independently of the first supply source, wherein the apparatus, the pressure control valves and the second supply source form an electronically controlled part of a redundancy level of the EBS, and
wherein the EBS has a pneumatic fallback level for when there is a failure of the first supply source, wherein the pressure regulating modules, the foot brake module and the pressure control valves enable the pneumatic fallback for the failure of the first supply source, so that the pressure regulating modules are configured to receive or to generate pneumatic control signals, so as to ensure operation of the EBS,
wherein a front axle circuit includes front axle pressure control valves, each of which controls a front wheel brake, wherein a front axle pressure regulating module is coupled between the front axle pressure control valves, and wherein a front axle pressure control valve is coupled in line with the front axle pressure regulating module,
wherein a rear axle circuit, which includes a rear axle pressure regulating module coupled to at least one rear axle pressure control valve, is coupled to rear wheel brakes,
wherein a trailer circuit includes a trailer pressure regulator of a trailer module, which is coupled to a trailer pressure regulating valve, which is coupled to the front axle pressure control valve,
wherein the pressure accumulators are coupled to the foot brake module, which is coupled to: (i) the front axle pressure control valve, (ii) the rear axle pressure regulating module or the at least one rear axle pressure control valve, and (iii) the trailer pressure regulator of the trailer module.

13. The electronic brake system of claim 12, wherein the at least one electronic control unit includes a plurality of electronic control units, in each case, one of the plurality of the electronic control units is connected fluidically to a separate non-electric circuit, and is configured to be actuated separately via the at least one interface of the module, and wherein one of the plurality of the electronic control units is configured to generate brake pressures from non-electric control signals of the respective non-electric circuit for an axle of the vehicle.

14. The electronic brake system of claim 12, wherein the at least one electronic control unit is configured to generate brake pressures for the actuation of the brake of at least one trailer from non-electric control signals, wherein the at least one electronic control unit is connected to the non-electric circuit, which includes a pneumatic circuit, which is either a separate circuit or which is connected to at least one further electronic control unit.

15. The electronic brake system of claim 12, wherein the second supply source is electric, further comprising:
at least one modulator in the at least one non-electric circuit, and which is configured to modulate a corresponding non-electric, which is pneumatic, control signal to a corresponding one of the plurality of the electronic control units, and/or at least one modulator to modulate the brake pressure of a electronic control unit to the brake;
wherein the at least one modulator is configured both to be actuated by the electronic control unit, which is supplied by the first supply source, and to be actuated by the electronic control unit, which is supplied by the second supply source.

16. The electronic brake system of claim 15, further comprising:
an apparatus for generating non-electric control signals for the electronic brake system, which has the first supply source, including: at least one interface configured to be connected to the pressure accumulator, and the at least one interface to output the control signals, wherein the apparatus is configured to be supplied via the second supply source, wherein the apparatus is connected to the at least one interface of the module, and which is connected by the at least one interface to the pressure accumulator;
wherein the electronic control unit is for electronically performing a control operation of the apparatus and/or the modulators;
wherein the apparatus and the electronic control unit is configured to be supplied by the further supply source.

17. The electronic brake system of claim 12, wherein the at least one interface is configured to detect wheel rotational speeds of at least one wheel, wherein the electronic brake system is configured to carry out the generation of the brake pressures with consideration of the detected wheel rotational speeds, by the electronic control unit.

* * * * *